March 29, 1932. C. B. CLARK 1,851,272
PRODUCTION OF ANHYDROUS ALUMINUM CHLORIDE
Filed Nov. 8, 1927
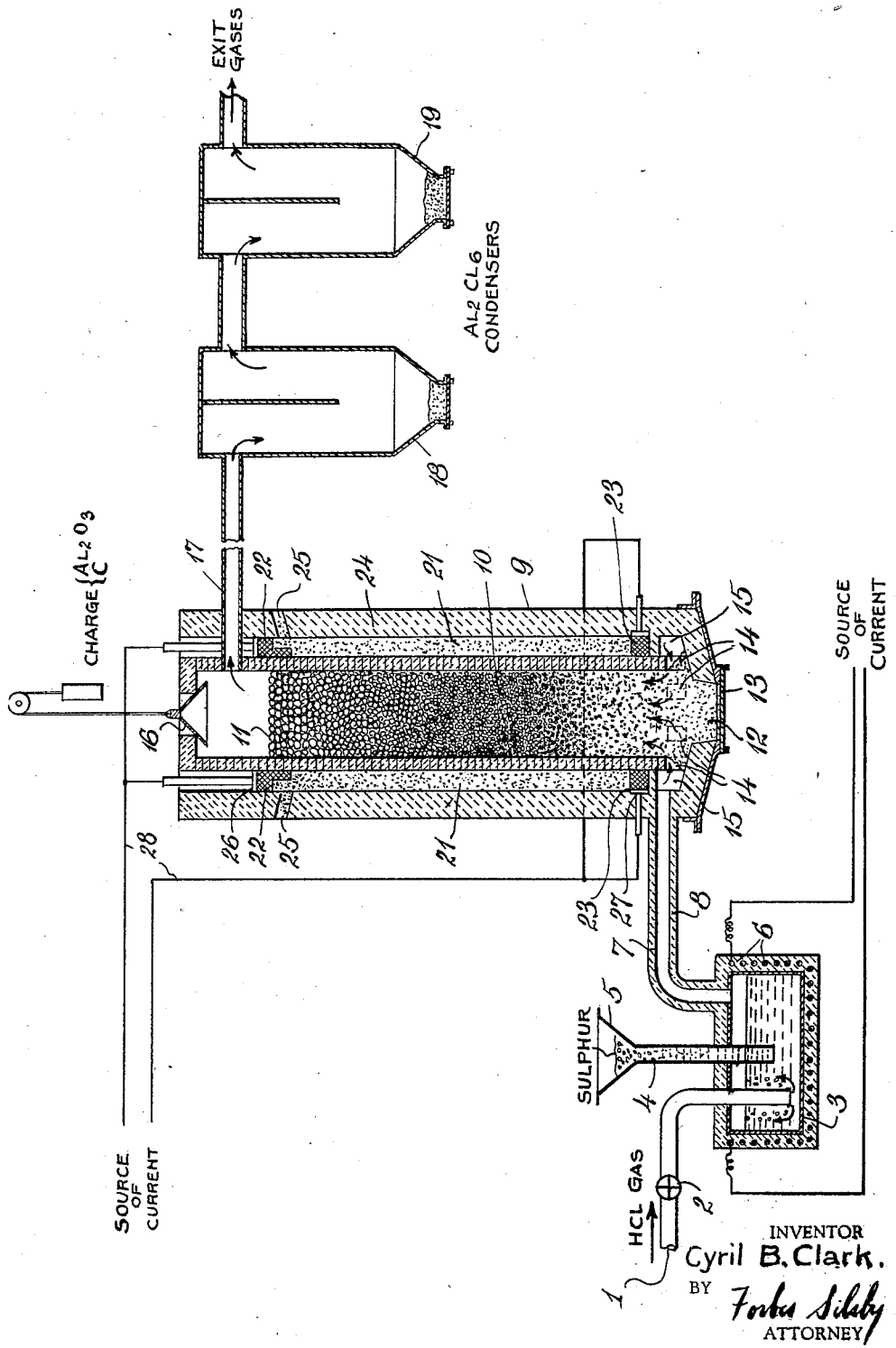
INVENTOR
Cyril B. Clark.
BY Forbes Silsby
ATTORNEY Patented Mar. 29, 1932

1,851,272

UNITED STATES PATENT OFFICE

CYRIL B. CLARK, OF SCARSDALE, NEW YORK, ASSIGNOR TO GENERAL CHEMICAL COMPANY, OF NEW YORK, N. Y., A CORPORATION OF NEW YORK

PRODUCTION OF ANHYDROUS ALUMINUM CHLORIDE

Application filed November 8, 1927. Serial No. 231,795.

This invention relates to the production of anhydrous aluminum chloride, and more particularly to a process for efficiently and cheaply producing the same.

Anhydrous aluminum chloride is at present being used in considerable quantities in many industrial applications. It is used in the preparation of aluminum metal, and very extensively in carrying out Friedel-Crafts organic reactions. It finds its principal use, however, in the petroleum refining industry, and its great value in this latter application results from its ability to crack hydrocarbons, and to desulfurize the oil.

The greatest problem connected with the use of anhydrous aluminum chloride in its widespread application to petroleum refining is the present high cost of the anhydrous aluminum chloride. The spent aluminum chloride remaining after the petroleum refining operation is recoverable in the hydrous form, but the hydrous chloride cannot be reconverted directly into the anhydrous form by simple dehydration.

My invention broadly contemplates chlorination of alumina-bearing materials by means of hydrochloric acid and utilizes as a source of alumina, readily available materials such as the residual aluminum oxide obtained by dehydration of the hydrous aluminum chloride resulting in petroleum refining, bauxite, clay, natural alumina, and the like, in conjunction with novel means for rendering these compounds very reactive to the hydrochloric acid.

I have discovered that when a charge of alumina-bearing material and carbonaceous material is treated at a sufficiently high temperature with substantially dry hydrochloric acid and a sulfurous material such as elemental sulfur, carbon bisulfide, sulfur dioxide, or the like, that anhydrous aluminum chloride is formed together with certain other compounds as hereinafter described in detail. The aluminum chloride thus formed may be readily condensed and recovered in the anhydrous form.

In the accompanying drawing, I have diagrammatically shown one arrangement which I have found effective for the application of my process.

Referring to the drawing, reference numeral 1 indicates a conduit leading from any suitable source of hydrochloric acid, such for example as a furnace producing the same by the interaction of sodium chloride and sulfuric acid. I have found it desirable to employ substantially dry hydrochloric acid gas, and this may be readily accomplished by contacting the gas with sulfuric acid in a suitable dryer. Conduit 1 is provided with a control valve 2 and leads into a closed and insulated sulfur pot 3 to a point near the bottom thereof, a feed pipe 4 leading from a hopper 5 being provided for the introduction of molten sulfur. Heating of the pot to maintain the sulfur in molten condition is accomplished in any suitable manner, such as by a wire wound resistor construction 6, of any well-known type, connected to a suitable source of electric current.

From the pot 3 a delivery pipe 7, preferably covered with heat insulation 8, leads into the bottom of a furnace 9 of any suitable construction, a carbon resistor type being shown in the present application. The furnace 9 comprises a relatively narrow, elongated chamber 10, adapted to contain a charge 11, which chamber is constructed, for example, of carborundum brick, and is of sufficiently restricted internal diameter (for instance about one foot) and appropriate wall thickness to assure thorough heat distribution to the charge therein. The lower end of the chamber 10 terminates in an ash pit 12 provided with a suitable dumping means such as a trap 13. The lower portion of the chamber may be provided with a plurality of spaced gas inlet passages 14 communicating with an annular gas distributing passage 15 into which enters gas delivery pipe 7.

A charging inlet 16 is located in the upper portion of the furnace, and leading from the chamber 10 a conduit 17 is provided for conducting the gaseous products of the reaction to suitable condensers 18 and 19. A resistor heating unit comprising a resistor layer of carbon 21 is placed intermediate upper and lower carbon electrodes 22—23, which construction surrounds the chamber 10. A thick layer of heat insulation 24 is arranged about the entire construction. Ducts 25 are provided in the insulating layer 24 through which carbon is supplied to the resistor layer in the vicinity of the electrode 22. The electrodes are provided with copper electrode connector clamps 26—27 attached thereto, which may be water cooled as is customary in this art. The electrode clamps are in turn connected with a pair of lead-in wires 28 leading to a source of electric current.

With the alumina-bearing material called for by my process being supplied in the form of substantially pure alumina, the carbonaceous material as charcoal, and the sulfurous material as elemental sulfur, an illustrative embodiment of the general manner of carrying out the process of my invention is as follows: The charge for the furnace, comprising the charcoal and the alumina, is preferably prepared as an intimate mixture and is preferably well dehydrated. I have found briquetting of the mixture of carbon and alumina to be well suited to the present operation. This charge is introduced into the upper portion of the furnace through the inlet 16, and the temperature in the furnace brought up to above substantially 850° C., and preferably between 1150° C. and 1350° C. Molten or solid sulfur is then, or previously, introduced into the sulfur pot 3 through the feed pipe 4, and the temperature in the pot is brought to and maintained preferably between 300° C. and 350 C., or at such temperature as will provide the proper porportion of sulphur vapor in the hydrochloric acid gas. The valve 2 is then opened and the dry hydrochloric acid gas is introduced through the conduit 1 into the sulfur pot 3 at the bottom thereof whence it bubbles up through the molten sulfur and, charged with sulfur vapor, then passes over through the delivery pipe 7 into the bottom of furnace 9. This gaseous mixture then passes up through the heated charge 11, and thereupon a reaction takes place in which anhydrous aluminum chloride is formed. The rate of flow of the entering mixture of sulfur vapor and hydrochloric acid gas through the charge may be varied as desired, but in general the slower the speed of passage the more complete will be the interaction in the furnace. A rate of flow, for example, of about 20 cu. ft. per hour per cubic foot of charge (at standard conditions) gives a quite satisfactory result. The exact mechanism of the chemical reaction which takes place in the furnace is difficult to ascertain, but irrespective of its exact nature it is apparently best explained by the following equation:

(A) $Al_2O_3 + 3C + 3S + 6HCl = 2AlCl_3 + 3H_2S + 3CO$

I have found that the proportions of the reacting materials, i. e., the proportion of alumina to carbon in the solid charge, and the proportion of sulfur to hydrochloric acid in the entering gases, may be maintained roughly about the same as theoretically required by the equation, although as pointed out hereinafter I prefer to have present an excess of carbon over the theoretical amount, and the same applies to the hydrochloric acid. This reaction appears to proceed best when the temperature of the chamber is maintained as noted, i. e., above substantially 850° C. and preferably between 1150° C. and 1350° C.

When the process is carried out in the manner described, anhydrous aluminum chloride comes off through the pipe 17 in a mixture of various gases from which it is easily separated by condensation in the condensers 18 and 19. The exit gases consist mainly of $HCl, H_2S, CO, CS_2, COS$, and probably some $H_2$. The CO and $H_2S$ are, in the main, the normal products of the major reaction indicated. Some CO is probably formed also by interaction of carbon with the moisture which is usually present in slight amount, $H_2$ also resulting from this reaction. A slight amount of CO also may be formed by interaction of some of the carbon with atmospheric oxygen, for some slight amount of air is usually present in the furnace. The $H_2$ formed is mainly ascribable to the tendency of $H_2S$ to dissociate into $H_2$ and $S_2$ at the temperature of the furnace, the sulfur formed thereby reacting with carbon and CO to form $CS_2$ and COS.

The amount of carbon provided in the charge should, in practice, be in excess of the theoretical amount called for by the major reaction indicated by Equation A in order to assure, with an adequate margin of safety, substantially complete utilization of the alumina, and to compensate for carbon losses caused by interaction of the same with other than the principal raw materials, some of which have just been noted. The excess of carbon in each case is determined by the particular conditions, and especially by the nature and composition of the materials being used.

While I have found it preferable in carrying out the process to mix the hydrochloric acid gas and the sulfur vapor prior to their joint introduction into the furnace, individual introduction can also be resorted to.

The method of procedure I have just described, using substantially pure alumina, elemental sulfur, and charcoal with the hydrochloric acid, is likewise applicable when working with other combinations of raw materials of a similar order. The fundamental requirements are that the charge contain some alumina-bearing material such as natural alumina, the residual aluminum oxide obtained from dehydration of the hydrous chloride, bauxite, clay or other siliceous alumina-bearing materials, in conjunction with a carbonaceous material such as charcoal, coke, coal, etc., and that, in addition to hydrochloric acid, a sulfurous material such as elemental sulfur, carbon bisulfide, sulfur dioxide, and the like be used. In view of the general undesirability of having any substantial amount of water in the constituents present in the furnace I prefer to employ solid carbonaceous material low in hydrocarbons which may react to form water.

When carbon bisulfide is substituted for the elemental sulfur in the process just described, the reaction which takes place is probably best expressed by the equation:

(B) $2Al_2O_3 + 3C + 3CS_2 + 12HCl = 4AlCl_3 + 6CO + 6H_2S$

In the absence of carbon in the charge an appreciable amount of free sulfur would normally be expected as a resultant product according to the equation:

$Al_2O_3 + 3CS_2 + 6HCl = 2AlCl_3 + 3CO + 3H_2S + 3S$

The presence of the carbon in the batch, however, serves to reconvert this sulfur into $CS_2$, and it will be noted from a comparison of these two reactions that only half as much $CS_2$ need be furnished when carbon is present in the charge.

When $SO_2$ is the sulfurous material used in the process, the reaction apparently proceeds according to the equation:

(C) $Al_2O_3 + 9C + 3SO_2 + 6HCl = 2AlCl_3 + 9CO + 3H_2S$

As in the case of reaction (A) using sulfur, the proportions of the reacting materials in (B) and (C) may be roughly about the same as those theoretically called for by the respective equations noted with such compensations and regulation of amounts as the particular conditions call for.

The exit gases resulting when $CS_2$ and $SO_2$ are used contain substantially the same products as in the case of elemental sulfur.

When bauxite, clay, and other forms of alumina-bearing material are used as alumina sources in the process hereinbefore described, the procedure is carried out in substantially the same manner with such reasonable changes as are necessary to take care of the additional components of the alumina-bearing charge. When these materials are used, some impurities such as ferrous chloride and silicon chloride occasionally condense with the anhydrous aluminum chloride and it is necessary to separate them therefrom by fractional condensation. In the main, however, the use of alumina-bearing material having a higher content of impurities is generally taken care of simply by a proper adjustment of the amounts of carbonaceous material, sulfurous material, and hydrochloric acid to compensate for amounts of the same which are used up in side reactions.

An advantage of some importance in my process resides in the fact that it is inherently well adapted to cope with the problem of practical recovery of anhydrous aluminum chloride in petroleum refining. By heating the hydrous aluminum chloride resulting from the refining process a relatively pure alumina can be obtained which is utilizable in the present process, and the hydrochloric acid evolved upon heating is also possible of use as a source of the gas called for by my process.

While I have described a preferred embodiment of my invention, it is to be understood that I consider my invention to contemplate and to extend to the use of all equivalent materials, steps, and operations such as may fall within the scope of the following claims.

I claim:

1. The process of manufacturing anhydrous aluminum chloride which comprises reacting hydrochloric acid gas, alumina-bearing material, sulfurous material, and carbonaceous material under the influence of heat to form aluminum chloride.

2. The process of manufacturing anhydrous aluminum chloride which comprises reacting hydrochloric acid gas, alumina-bearing material, sulfur, and carbonaceous material under the influence of heat to form aluminum chloride.

3. The process of manufacturing anhydrous aluminum chloride which comprises reacting a charge containing alumina-bearing material and carbonaceous material in an atmosphere of hydrochloric acid gas and sulfurous gas under the influence of heat to form aluminum chloride.

4. The process of manufacturing anhydrous aluminum chloride which comprises passing hydrochloric acid gas and sulfur vapor in contact with a charge comprising alumina-bearing material and carbon at a temperature above substantially 850° C.

5. The process of manufacturing anhydrous aluminum chloride which comprises reacting hydrochloric acid gas, alumina-bearing material, sulfurous material, and carbonaceous material at a temperature above substantially 850° C.

6. The process of manufacturing anhydrous aluminum chloride which comprises reacting hydrochloric acid gas, alumina-bearing material, sulfurous material, and carbonaceous material at a temperature between 1150° C. and 1350° C.

7. The process of manufacturing anhydrous aluminum chloride, which comprises passing hydrochloric acid gas and sulfur vapor in contact with a charge comprising alumina-bearing material and carbonaceous material at a temperature between 1150° C. and 1350° C.

8. The process of manufacturing anhydrous aluminum chloride which comprises preparing a mixture of hydrochloric acid gas and sulfur vapor, and then passing the resultant gaseous mixture in contact with a charge comprising alumina-bearing material and carbonaceous material while maintaining the temperature above substantially 850° C.

9. The process of manufacturing anhydrous aluminum chloride which comprises preparing a mixture of hydrochloric acid gas and sulfur vapor, and then passing the resultant gaseous mixture in contact with a charge comprising alumina and solid carbon while maintaining the temperature above substantially 850° C.

10. The process of manufacturing anhydrous aluminum chloride which comprises passing hydrochloric acid gas in contact with sulfur at a temperature between 300° C. and 350° C., and then passing the resultant gaseous mixture in contact with alumina-bearing material and carbonaceous material at a temperature above substantially 850° C.

11. The process of manufacturing anhydrous aluminum chloride which comprises passing hydrochloric acid gas in contact with sulfur at a temperature between 300° C. and 350° C., and then passing the resultant gaseous mixture in contact with a charge comprised of an intimate mixture of alumina-bearing material and solid carbon at a temperature between 1150° C. and 1350° C.

12. The process of manufacturing anhydrous aluminum chloride which comprises reacting hydrochloric acid gas, bauxite, sulfur, and carbon under the influence of heat to form aluminum chloride.

13. The process of manufacturing anhydrous aluminum chloride, which comprises effecting a reaction between an alumina-bearing material, sulfurous material, carbonaceous material, and hydrochloric acid gas under the influence of heat, the said carbonaceous material being present in excess of the theoretical amounts required to produce anhydrous aluminum chloride.

14. The process of manufacturing anhydrous aluminum chloride, which comprises effecting a reaction between an alumina-bearing material, sulfurous material, carbonaceous material, and hydrochloric acid gas under the influence of heat, the said carbonaceous material being of such a nature that it contains a low percentage of hydrocarbons capable of reacting to form water under the conditions of the aforesaid process.

15. The process of manufacturing anhydrous aluminum chloride, which comprises reacting hydrochloric acid gas, alumina-bearing material, carbonaceous material and a substance from the group consisting of sulphur, sulphur dioxide, and carbon bisulfide under the influence of heat to form aluminum chloride.

16. The process of manufacturing anhydrous aluminum chloride, which comprises passing hydrochloric acid gas and a substance from the group consisting of sulphur, sulphur dioxide, and carbon bisulfide in contact with alumina-bearing material and carbonaceous material while maintaining the temperature above substantially 850° C.

17. The process of manufacturing anhydrous aluminum chloride, which comprises reacting hydrochloric acid gas, sulphur, carbon, and a substance from the group consisting of alumina, bauxite, and clay, under the influence of heat to form aluminum chloride.

18. The process of manufacturing anhydrous aluminum chloride which comprises reacting hydrochloric acid gas, alumina-bearing material, carbon bisulfide, and carbonaceous material under the influence of heat to form aluminum chloride.

19. The process of manufacturing anhydrous aluminum chloride which comprises reacting hydrochloric acid gas, alumina-bearing material, sulfur dioxide, and carbonaceous material under the influence of heat to form aluminum chloride.

20. The process of manufacturing anhydrous aluminum chloride which comprises passing hydrochloric acid gas and sulfur dioxide gas in contact with alumina-bearing material and carbonaceous material while maintaining the temperature above substantially 850° C.

21. The process of manufacturing anhydrous aluminum chloride which comprises passing a mixture of hydrochloric acid gas and carbon bisulfide in contact with alumina-bearing material and carbonaceous material while maintaining the temperature above substantially 850° C.

22. The process of manufacturing anhydrous aluminum chloride which comprises reacting hydrochloric acid gas, clay, sulfur and carbon under the influence of heat to form aluminum chloride.

In testimony whereof, I affix my signature.

CYRIL B. CLARK.